J. J. CONVERY.
SHOCK ABSORBING SPRING SUSPENSION DEVICE.
APPLICATION FILED MAY 11, 1914.
1,171,839.
Patented Feb. 15, 1916.
2 SHEETS—SHEET 1.
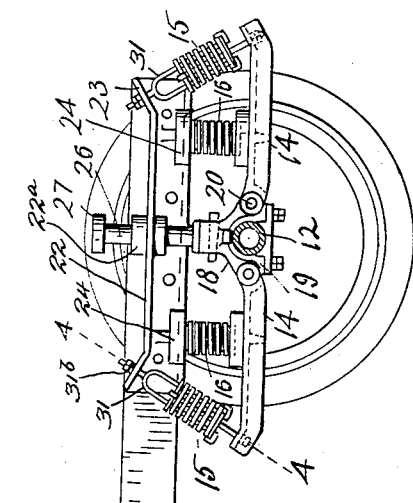
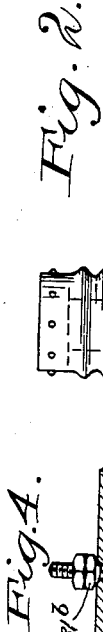
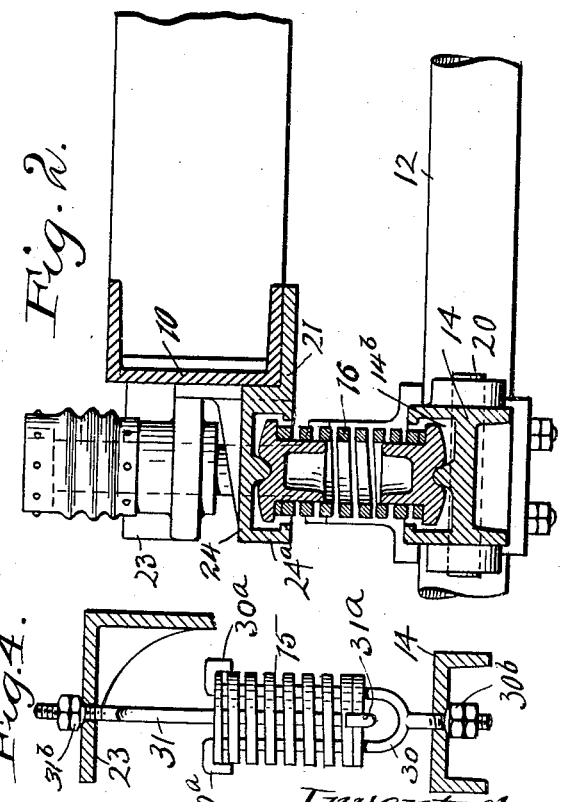
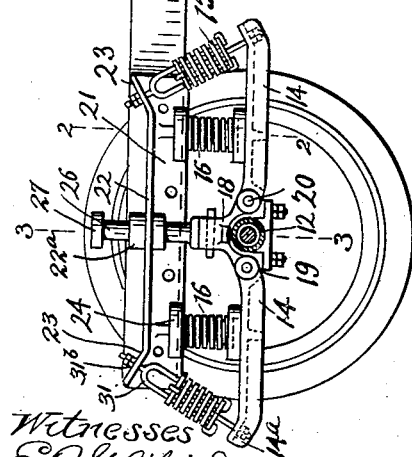

J. J. CONVERY.
SHOCK ABSORBING SPRING SUSPENSION DEVICE.
APPLICATION FILED MAY 11, 1914.
1,171,839.
Patented Feb. 15, 1916.
2 SHEETS—SHEET 2.
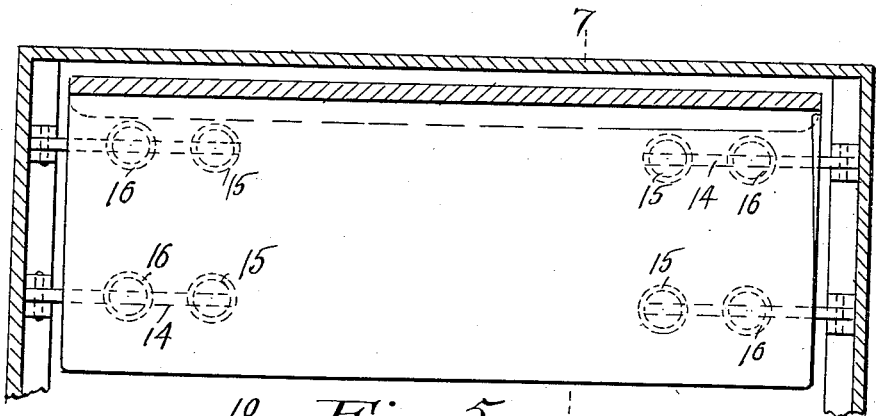
Fig. 5.
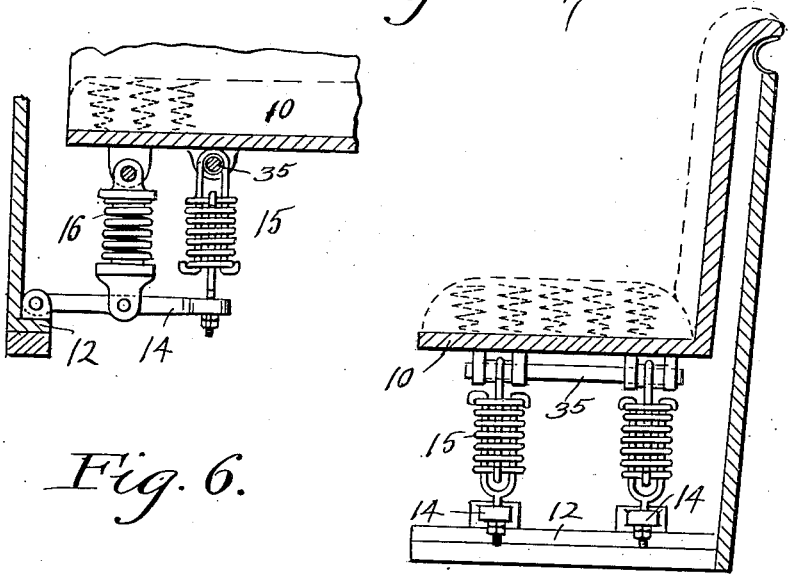
Fig. 6.
Fig. 7.
Witnesses.
E. B. Gilchrist
L. I. Porter
Inventor.
John J. Convery
by Thurston & Kwis
Attorneys

UNITED STATES PATENT OFFICE.

JOHN J. CONVERY, OF AKRON, OHIO.

SHOCK-ABSORBING SPRING SUSPENSION DEVICE.

1,171,839.  Specification of Letters Patent.  Patented Feb. 15, 1916.

Application filed May 11, 1914.  Serial No. 837,672.

*To all whom it may concern:*

Be it known that I, JOHN J. CONVERY, a citizen of the United States, residing at Akron, in the county of Summit and State of Ohio, have invented a certain new and useful Improvement in Shock-Absorbing Spring Suspension Devices, of which the following is a full, clear, and exact description.

This invention is an improved shock absorbing spring suspension device suitable for use in many places as the means for so connecting a supported member and the supporting member therefor that jars and jolts applied to the latter will have very little effect in causing up and down movement of the former.

The invention is adapted for use in supporting a vehicle body upon the running gear, as, for example, in an automobile. It is also adapted for supporting seats upon vehicles. The drawings show both applications of the invention, but without any intention of limiting the invention to either use, except to the extent clearly expressed in the claims.

The invention is hereinafter described and definitely pointed out in the appended claims.

In the drawings Figure 1 is a sectional side elevation of a vehicle equipped with this invention. Fig. 2 is a transverse vertical section in the plane indicated by line 2—2 on Fig. 1. Fig. 3 is a vertical transverse section in the plane indicated by line 3—3 on Fig. 1. Fig. 4 is a section in the plane indicated by line 4—4 on Fig. 1. Fig. 5 is a plan view of the invention applied to a vehicle seat. Fig. 6 is a sectional front view of one end of said seat; and Fig. 7 is a section in the plane of line 7—7 on Fig. 5.

Referring to the parts by reference characters, 10 represents the member to be supported, and 12 represents the underlying supporting member.

As shown in Figs. 1–4 the supported member is the body frame, and the supporting members are the two axles.

As shown in Figs. 5–7 the supported member is a seat, and the underlying supporting member is a part of the body frame.

14 represents a lever which is pivoted to the supporting member by means of a horizontal pivot, and extends from its pivot in a substantially horizontal direction.

15 represents a coil spring which is so connected with the otherwise free end of the lever and with the supported member, that it will yieldingly oppose any relative downward movement of the end of the lever. In other words, it will exert its force to draw the lever and the supported member toward one another.

16 represents another coil spring which is so arranged that it exerts its force to yieldingly oppose the upward movement of the lever relative to the supported member, or, in other words, it exerts its force to move the lever and supported member apart.

Now, when this invention is employed in connection with an automobile, there will preferably be two of these levers and associated springs applied to each end of each axle, which axles, as before stated, are the supporting members.

The embodiment of the invention shown in Figs. 1–4 includes, as the means for pivoting each pair of levers to the axle, a clamping device 18 adapted to be secured to each axle near each end thereof. This clamping device has two ears 19 and 20, which respectively extend forward and backward. One lever 14 is pivoted to one ear, and extends rearward therefrom, and the other lever 14 is pivoted to the other ear and extends forward therefrom. To facilitate the application of the springs to said levers and the supported body frame of the vehicle, a bracket plate 21 is connected with the body frame near each corner thereof, so as to substantially overlie the two associated levers. Each of these bracket plates is preferably secured to the inner side of a side member of the body frame, and it is provided with inwardly extended flanges 22, 23 and 24, there being on each bracket two flanges 24 and two flanges 23 which, as shown, are angular extensions of the flange 22. The flange 22 carries a sleeve 22ª in which a tubular bushing 22ᵇ is secured. A stem 26 which is fixed to the clamping member 18 extends vertically upward therefrom and passes loosely through the hole in this bushing. The stem has preferably a head 27 on its upper end, too large to go through this bushing. The function of the stem and this bushed sleeve is to confine the relative movements of the supported and supporting member within desired limits.

The flanges 24 and the levers 14 are formed with spring seats 24ª and 14ᵇ, between which the compressed coil springs 16 are confined; wherefore, as before stated, the force of each spring is exerted in the direction tending to force the associated lever 14 down relative to the body member, and therefore to yieldingly resist the movement of the supported body member and lever toward one another. The coil spring 15 which is associated with the end of each lever is inclined from its lower end upward toward the pivot of the associated lever. Two tug links 30, 31, pass respectively through this coil spring. One of these tug links 30 has the outwardly extended fingers 30ª engaging the upper end of the spring. The lower end of this tug link passes rather loosely through a hole in a part of the lever near the end thereof, said part 14ª of the lever being so inclined that it is substantially at right angles to the axis of the spring. The lower face of this lever around this hole is preferably spherically countersunk. The nut 30ᵇ which screws onto the threaded lower end of this tug link below the lever is similarly shaped on its upper face, wherefore the connection between the spring and the lever is, in effect, a ball and socket connection. The other tug link 31 has outwardly extended fingers 31ª which engage the lower end of the spring, while the upper end of the tug link passes rather loosely through a hole in the flange 23 on the bracket plate,—said flange being likewise inclined so as to lie substantially at right angles to the axis of the spring. The upper face of this flange is spherically countersunk around the hole, and the nut 31ᵇ which screws onto the projecting upper end of the tug link is similarly shaped on its lower face, wherefore the connection between the spring and the supported member is substantially a ball and socket connection. It is to be understood that, preferably, the described mechanism is to be found adjacent to each end of each axle, if said invention is to be used most advantageously as the means for supporting the body from the axles.

It is apparent that when any force acts upon any supporting member 12,—that is to say, upon either end of either axle tending to move it up, the springs 16 interposed between the two associated levers and the supported body member will be put under greater tension, so that they will tend to likewise force the supported body upward. At the same time the other springs 15, associated with each lever, will be put under greater tension, and will thereby act with greater force to pull the supported member down. The net result of the opposed actions of these springs will be to hold the supported body member in substantially the horizontal plane in which it is. Of course it is not pretended that this desirable result will be perfectly attained, but it will be closely approximated, especially if the normal tension of the springs has been properly adjusted for the conditions of use. This adjustment is easily brought about by turning one or the other or both of the nuts 30ᵇ or 31ᵇ on the two tug links, so as to increase or decrease the tension of the spring 15 with which the tug links are associated. Any increase in the tension of this spring will necessarily be attended by a corresponding increase in the tension of the other spring 16 associated with the same lever.

By reason of the fact that the springs associated with the rearwardly extended levers are inclined, these springs will tend to prevent the body from being jerked forward if the vehicle is suddenly started forward. The inclination of the corresponding springs associated with the forwardly projecting levers will tend to relieve the body of jerks which might otherwise result from suddenly starting the vehicle rearward.

In the embodiment of the invention shown in Figs. 5–7 the supported member 10 is a seat carrying frame, and the supporting member 12 is a rigid part of the vehicle body. Four levers 14 and associated springs 15 and 16 are employed, one at each corner of the seat frame. These are all preferably mounted on horizontal pivots extending lengthwise of the vehicle and carried by the supporting member. The two springs 15 and 16, occupy the same relation to the seat frame, and each lever 14, as has before been explained. It is believed that with this explanation taken in connection with the drawings, and the foregoing description of the invention generally, one will readily understand how to adapt the invention for use in supporting a seat. One slight modification of the construction appears in these drawings, namely, that each upper tug link 31 is U-shaped at its upper end and embraces a rod 35 fixed to the supported member 10, thereby giving to said tug link the universal action which is desired.

Having described my invention, I claim:

1. In a shock absorbing spring suspension mechanism, the combination of the supported member, and the underlying supporting member, of a lever pivoted to the latter, a compression coil spring which opposes the movement of said lever and supported member away from each other, a pair of tug links which respectively connect the lower end of said spring with the supported member, and the upper end of said spring with the end of said lever, the axis of said spring being inclined from its lower end upward and toward the pivot of the lever, and a compression coil spring interposed between the supported member and the lever at a point thereon intermediate of the pivot of the lever and the free end thereof which latter compression coil spring acts to oppose the movement of said lever and supported member toward one another.

2. In a shock absorbing spring suspension device for vehicles, the combination with an axle and the body frame thereover, of a device connected with an axle and provided with oppositely extended ears, two levers pivoted to said ears and extending in opposite directions therefrom, and two springs associated with each lever, to wit: one coil spring, and means connecting the same with the body member and with the lever near the end thereof, and one coil spring under compression located between a rigid part of the body and said lever at a point intermediate of the pivot of the lever and the point at which the other spring is connected thereto,—the former spring being arranged to yieldingly oppose downward movement of the lever relatively to the body frame.

3. In a shock absorbing spring suspension mechanism for vehicles, the combination with an axle, and body frame thereover, of a device adapted to be secured to an axle and having two oppositely extended ears, and a vertically extended stem, a bracket plate adapted to be secured to the body frame and having three flanges, one having a hole through which said stem extends loosely, two levers respectively pivoted to said ears and extending therefrom in opposite but substantially horizontal directions, two compression coil springs interposed respectively between said levers and flanges on said bracket plate, and two other springs, one associated with each lever, and two tug links associated with each of the last named springs, one of said tug links being connected with a flange of said bracket plate, and the other with the associated lever near the end thereof.

In testimony whereof, I hereunto affix my signature in the presence of two witnesses.

JOHN J. CONVERY.

Witnesses:
  E. L. THURSTON,
  S. I. PORTER.